June 21, 1932.   H. F. TAYLOR   1,864,285
STEAK AND METHOD OF PRODUCING SAME

Filed May 23, 1931

INVENTOR
Hayden F. Taylor
BY
Wm. J. Cuthbard.
ATTORNEY

Patented June 21, 1932

1,864,285

UNITED STATES PATENT OFFICE

HARDEN F. TAYLOR, OF SCARSDALE, NEW YORK, ASSIGNOR TO THE ATLANTIC COAST FISHERIES COMPANY, OF NEW YORK, N. Y., A CORPORATION OF MAINE

STEAK AND METHOD OF PRODUCING SAME

Application filed May 23, 1931. Serial No. 539,435.

This invention relates to comestibles and more particularly to steaks or steak-like products, and to the method of producing the same.

Prior to this invention some of the objection to fish, namely, the presence of bones, skins and other tissues, have been partly overcome by the practice of producing fillets of fish. Fillets of fish comprise the two lengthwise strips of flesh on both sides of or parallel with the backbone or spinal column of the fish. They are substantially free from bones and may be skinned if desired.

The practice of filleting fish represented a definite improvement over the older custom of serving the whole fish together with bones and/or skin. Nevertheless, they had several objections. Being longitudinal parts of fish, the muscle fibers thereof ran parallel with the longest dimension. This made the portion tougher or less tender than it would have been if the cut were at right angles to the fibers.

Another objection to fillets was that they could only be prepared from fish of certain size ranges, since it was desirable that each fillet be approximately a portion suitable for individual sale or consumption. This practice thus prevented the filleting of a large variety of fishes, including halibut, salmon, large cod and the like for the reason that fillets prepared from said fishes are too large for individual sale and consumption.

Another objection to fillets was that even though they were of suitable size as above mentioned, they were irregular in shape, thickness and width. This fact had several undesirable consequences. For instance, during cooking the thin portions were cooked sooner than the thick portions, so that it became difficult to cook one portion thereof without over or undercooking the other parts. When served, one person would receive a thicker or more desirable portion than another. Also, due to the size of the fillets they were too large for the frying pan and were difficult to package neatly. They occupied excessive space in packages, more particularly when they were frozen. Furthermore, in the manufacture of fillets a certain amount of inspection was necessary. The over and undersized ones and the broken or torn ones were separated. These were difficult to dispose of profitably and therefore resulted in more or less of a loss to the producer.

The above objections have been attempted to be overcome by steaking the fish. By the term "steaking" is meant the making of crosswise cuts of finned, scaled and gutted fish. As usually practiced, the backbone and skin were not removed and they formed parts of the steak. While this practice had the advantage of a cross-cut in so far as tenderness was concerned, it had other objections. The cross-sectional area of the fish varied greatly with the position along its length. Accordingly, no two steaks, even from the same fish, were alike in shape or size. Thus, standardization of size and shape was impossible and it was difficult to wrap or package the steaks neatly and economically. Furthermore, the steaks cut from the belly portion of the fish had as appendages portions of the belly wall. This gave a bad appearance to the steaks and if removed, occasioned a rather large loss. The bones remaining in the steak were obviously objectionable. The size of the fish near the tail rendered it impossible to form steaks therefrom, since they were too small to be of any use. Accordingly, other uses had to be found for this portion of the fish or else a loss had to be sustained.

Steaks of fish as above described could not be successfully applied to very large fishes such as cod, halibut, salmon and the like, for the reason that the steaks formed therefrom were too large for a single portion. They therefore had to be irregularly subdivided, whereby some of the above objections became apparent.

I have found that I can overcome the above mentioned disadvantage and objections by providing frozen steaks or steak-like products having a unitary structure consisting of a plurality of preferably cross-cut pieces of meat with or without peripheral bands.

It is, therefore, an object of this invention to provide frozen steaks or steak-like products formed of a plurality of preferably cross-cut pieces of meat with or without a band around the periphery thereof.

Another object of this invention is to provide methods of producing frozen steaks or steak-like products above described.

Other objects will become apparent from the following description, appended claims and accompanying drawing forming a part of this specification and wherein:

In order to more clearly describe the invention, the following methods of producing steaks and steak-like products are set forth. It is to be understood that the precise methods hereinafter described are not limitative of the invention but are merely illustrative of the various procedures which may be employed to carry out several of the different embodiments of the invention.

In carrying out one embodiment of the method, vegetable parchment paper is unwound from a roll and, as it comes from the roll, it is formed in a trough by raising the two edges with respect to the middle. In this paper trough skinned and boneless pieces of fish such as fillets are placed, preferably, longitudinally of the trough and parallel with one another. In arranging the fillets in the trough it is desirable that the thin and thick portions of the various composite pieces be made to overlap in such a manner that a continuous mass of fish is formed. The paper is continuously moved forward and the fillets are continuously added. As the paper trough moves forward, the upper edges thereof are gradually bent or folded in such a manner that a tube is formed. This tube surrounds and binds together the continuous cylindrical mass of fish. The tube of the paper may be overlapped, stapled, stitched or otherwise fastened.

If the steaks to be produced are to be subsequently frozen, it is sufficient to merely overlap the edges of the paper while they are wet.

In carrying out the method, it is desirable to wet the paper at some stage of the process as, for instance, prior and/or during the forming process. This wetting permits the paper to stretch during the process of forming the tube. If the paper were not wetted, it would become wet from the fish and later become loose by stretching.

Figure 2:
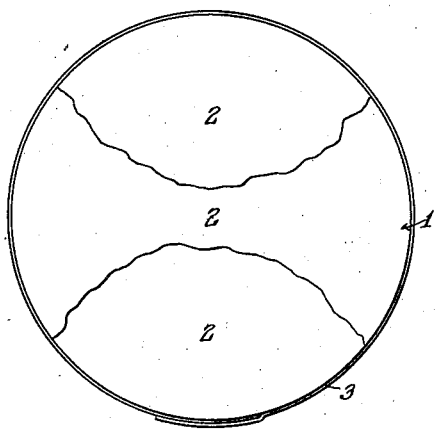
Figure 2 is a front elevation of a steak having a band around the periphery thereof.
Figure 3:
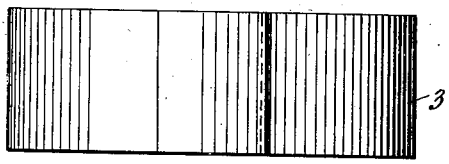
Figure 3 is a side elevation of the steak illustrated in Figure 2.

The continuously paper-bound mass of fish, as above produced, is then cut into portions of any desired thickness. In the cutting of the mass the cutting implement passes through both the fish and surrounding paper, thus producing disc-shaped steaks formed of a plurality of pieces of fish 2 having bands 3 of waterproof paper therearound (see Figures 2 and 3). It may occasionally happen that one exceptionally large fillet may fill the tube thus forming a steak or cut of one solid piece. Usually, however, the steak or cut will be composed of two or more small pieces as illustrated. In the event that the steak or cut is formed of a plurality of small pieces, the effect is the same as if it were one solid piece.

The severed portions are then frozen preferably by a quick freezing process. The freezing not only serves the purpose of preservation but also functions to fix the shape and cohesiveness of the composite steak into a permanent unitary structure, which shape is retained after defrosting. The frozen products are then wrapped or packaged in any suitable sanitary wrappers or boxes to produce neat and ornamental packages.

I have found that the tendency of the fillets to adhere to one another may be improved if they are treated prior to being formed into steaks with a mild alkaline brine such as described in my copending application Serial No. 276,493. This brining also functions to secure the benefits of the chemical behavior of the steaks if they are to be subsequently frozen. The adherence may also be improved by allowing the fillets to dry slightly. This drying causes the natural moisture surface which contains proteinaceous and gluey compounds to become tacky before the fillets are formed into steaks as above described.

Figure 1:
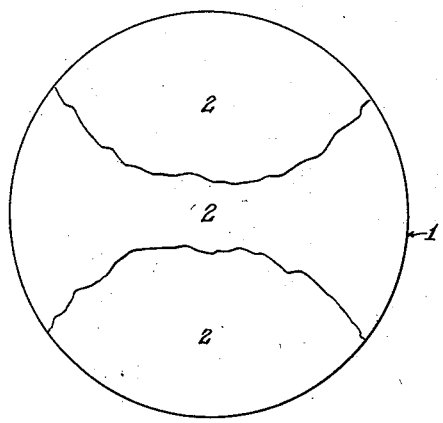
Figure 1 is a front elevation of one form of a steak produced in accordance with this invention.

While both procedures for improving the adherence of the fillets are helpful and may be used in the process, neither is necessary. The paper band or other means surrounding the steak holds it together effectively. On the other hand, I have found if maximum adherence is obtained, the paper may be used only temporarily or not at all, thus producing a steak formed of composite pieces of fish made without any external binder as illustrated in Figure 1.

In the above described methods I have disclosed the use of parchment paper. It is to be understood that various other means and materials may be used to hold the steak together. For instance, I have obtained satisfactory results with sheets of regenerated cellulose, fabrics and the like.

An as alternative procedure, instead of freezing the individual steaks as previously described, the wrapped mass may be frozen prior to the transverse cutting thereof. When this procedure is to be employed, the mass formed and preferably wrapped as above described is transversely cut to form cylindrical bodies of appropriate and convenient lengths which are frozen in any suitable manner. The frozen mass is then transversely cut or sawed into individual steaks of desired thicknesses.

The steaks produced as above described may be formed in various shapes. In the method disclosed, the steaks produced are circular or disc shaped. I prefer, however, to make the shape of the steaks elliptical or oval, since the circular shaped steaks have a tendency to assume this form. Furthermore, this shape suggests the natural cross-section of many species of fish. To make the steaks of this contour does not involve any material change in the process described. The cylindrical tube slightly loose and containing the mass of fish therein may be subjected to a slight compression either prior to or subsequent to the cutting of the mass.

Another modification of the present invention contemplates directly forming the individual steak-like products without producing a relatively large mass, as previously described. To achieve this a plurality of pieces 2 of meat is compactly and intimately packed in any convenient manner in a mold which corresponds in size and shape to the desired product. Thus, for example, when a cylindrically shaped steak is desired, the mold may consist of an angular ring or band 4 formed of any suitable material, such as a metal of good heat conductivity, the height of which is equivalent to the thickness of the steak. After the mold has been packed it is subjected to a freezing operation whereby the meat is frozen. The frozen meat, which constitutes the steak, is removed from the mold in any suitable manner, such as, for example, by exposing the outer surface of the mold to a temperature sufficient to slightly defrost the periphery of the steak and permit its removal. If desired, the mold 4 may be made in a plurality of sections 5 and 6. Means are provided to removably secure the sections together whereby after the freezing operation the sections may be separated and the steak more expeditiously removed. When a split ring is to be used as the mold, I prefer to secure the sections at one end together by means of a hinge 7 and detachably secure the opposite ends with any suitable locking means 8.

Figure 4:
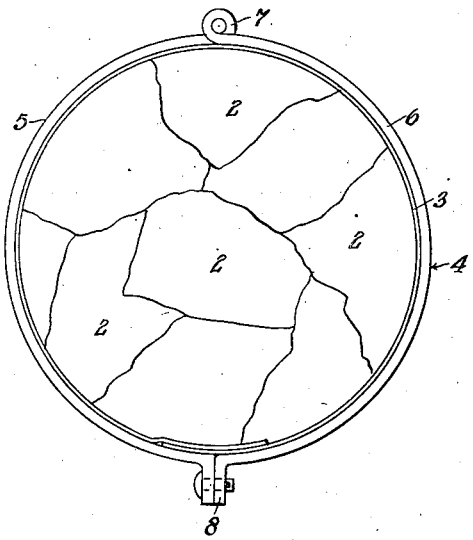
Figure 4 illustrates one step in one of the various methods of preparing steaks.
Figure 5:
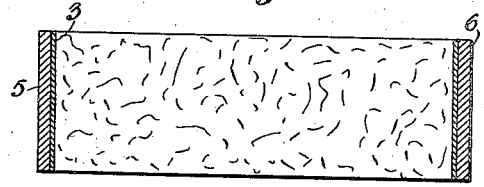
Figure 5 is a central vertical section of Figure 4.

When a band is to be disposed around the periphery of the steak, prior to the introduction of the pieces of meat 2 into a mold of the type hereinbefore described, the latter may be lined with a tape 3 of any of the previously mentioned materials which is of such a length that the ends thereof preferably overlap, as shown in Figure 4. Preferably, also, the width of the tape is equal to the height of the mold and/or the thickness of the steak. In accordance with this procedure, after the mold has been lined with the tape, preferably moistened, it is packed with the meat and subjected to a freezing operation, whereby the meat is frozen. The frozen steak together with the band around the periphery thereof is then removed from the mold.

In the preceding modifications of the methods of preparing steaks having bands around the peripheries thereof, the materials constituting the bands were disposed on the mass of meat, either prior to or during the freezing operation. The present invention also contemplates the disposition of the peripheral band on the frozen mass of meat. In accordance with this modification, a predetermined-shaped mass formed of a plurality of pieces of meat is first frozen, then wrapped and finally cut. The plurality of pieces of meat may be formed into a mass of any suitable shape and size with the aid of a mold of corresponding shape and size. Thus, for example, a plurality of pieces of meat may be tightly packed in a mold, such as a hollow cylinder or split cylinder, and the mold and contents subjected to a freezing operation. After removing the frozen cylinder of meat from the mold, it is wrapped around its peripheral surface with a suitable material, such as moistened parchment paper or the like, preferably with its side marginal edges overlapping. The wrapped mass is then transversely cut into disc-shaped steaks of uniform thickness. In those cases where the temperature of the frozen mass of meat is insufficient to cause the wrapper to intimately engage the mass, the wrapped mass may be subjected to a low temperature, whereby an intimate contactual relationship between the two is secured.

Instead of wrapping the frozen cylinder of meat and then cutting, the frozen meat cylinder may be transversely cut or sawed into circular discs of uniform size and the individual severed portions may be wrapped as hereafter more fully explained.

A tape of any suitable material, such as, for example, moistened parchment paper, is disposed around the periphery of the frozen steak, preferably with the ends thereof overlapping. In most cases the temperature of the steak is sufficient to cause the band to assume an intimate contactual relationship therewith. However, in order to assure this, the discs with the bands around the peripheries are subjected to a low temperature.

As an alternative method, the individual frozen steaks produced by freezing a plurality of pieces of meat in the ring mold, as previously explained, may be provided with bands as immediately hereinbefore described.

A further modified procedure which this invention contemplates comprises forming a flat slab of meat which is subsequently frozen, cut and wrapped by procedures similar to those described before. For example, a plurality of pieces of meat, such as, for example, fish fillets, are arranged to form a flat slab of preferably uniform thickness. Any suitable and well known means may be employed to expedite and aid in producing the slab, which is subsequently frozen, preferably by a quick freezing process. In the preferred embodiment of this modification the slab is formed on a plate which is subsequently chilled to produce the desired freezing. Upon slightly increasing the temperature of the plate, the frozen slab may be very readily removed. The frozen slab is then cut into portions of desired size. Where the slab is narrow, it may be only necessary to transversely cut it. On the other hand, if the slab is of considerable width, it may be necessary to cut it both longitudinally and transversely. The simplest form of steak produced by this procedure is square or rectangular, though it is to be understood that this procedure may produce steaks of any shape. If it is desired to provide the steaks with peripheral bands, this may be secured by the procedures previously described.

It is to be understood that the invention herein described is not limited to any particular species of meat, since it is equally applicable to all flesh foods of all animals.

The frozen steaks produced as above described comprise a plurality of cross-cut pieces of fish formed in any predetermined size or shape with or without means to effectively hold or maintain the fish in the desired shape or form. The steaks may be made of such a size that one will serve as a portion for the individual consumer. These steaks may be cooked and transported without coming apart. When cooked, they present a pleasing appearance to the consumer. Due to the fact that the size of the steaks is uniform, they may be neatly wrapped and packaged and will be uniformly cooked throughout. There will be no thin or thick portions nor portions over or undercooked. These steaks are not limited in their manufacture to any particular species of fish. They may be formed from any species of fish irrespective of size, since they are boneless, skinless and gutted. The entire portion, after the removal of the band, is fit for consumption.

From the foregoing it is apparent that the steps of wrapping, freezing, cutting, etc. need not be performed in any definite and precise sequence and, unless otherwise indicated, the claims are not restricted to any sequence of operations.

This application is a continuation-in-part of application Serial No. 343,569, filed February 28, 1929.

By the term "meat" as used herein is meant the flesh portion of comestibles of animal origin having internal skeletons and hemoglobin in the blood, such as fish, cattle, poultry, etc.

Since it is obvious that various changes may be made without departing from the nature of the invention, I do not limit myself to the exact specific details above set forth except as defined in the following claims.

I claim:

1. A food product comprising a frozen steak formed of a plurality of pieces of meat having a unitary and integral structure, a band adhering around only the longitudinal periphery thereof and extending over the entire thickness thereof, said band having its ends overlapping.

2. A food product comprising a frozen steak formed of a plurality of cross-cut pieces of meat having a band around the periphery thereof, the material forming said band being disposed around the steak forming mass prior to the freezing thereof.

3. A food product comprising a frozen steak formed of a plurality of cross-cut pieces of meat having a ban around the periphery thereof and extending over substantially the entire thickness thereof, the material forming said band being disposed around the steak forming mass prior to the freezing thereof.

4. In a method of producing frozen steaks the steps which comprise forming a predetermined shaped mass of a plurality of pieces of meat, peripherally wrapping said mass, transversely cutting said mass and freezing the meat.

5. A method of producing frozen steaks which comprises forming a predetermined shaped mass of a plurality of pieces of meat, wrapping the peripheral surface of said mass, freezing the wrapped mass, and cutting the frozen wrapped mass into portions of desired size.

6. A method of producing frozen steaks which comprises forming a predetermined shaped mass of a plurality of pieces of meat, freezing said mass, wrapping only the longitudinal peripheral surface of said frozen mass and cutting the wrapped frozen mass into portions of desired size.

7. A method of producing frozen steaks which comprises forming a predetermined shaped mass of a plurality of pieces of meat, freezing said mass, cutting said frozen mass into portions of desired size an disposing a band around only the longitudinal periphery of the severed portions.

8. In a method of producing frozen steaks the steps which comprise forming a predetermined shaped mass of a plurality of pieces of meat, disposing a material with its side marginal portions or ends overlapping around only the longitudinal periphery of said mass, freezing said mass and transversely cutting said mass.

9. A method of producing frozen steaks which comprises forming a predetermined shaped mass of a plurality of pieces of meat, freezing said mass, disposing a material with its side marginal portions overlapping around only the longitudinal peripheral surface of the frozen mass and cutting the frozen wrapped mass in portions of desired size.

10. A method of preparing individual frozen steaks which comprises lining a mold with a tape which is to extend over only the longitudinal peripheral surface of the steaks, packing said mold with a plurality of pieces of meat, subjecting the filled mold to a freezing operation and removing the frozen mass with the band around the periphery thereof and adhering thereto.

11. A process of producing steaks which comprises improving the adhesiveness of the surfaces of a plurality of pieces of meat, forming a predetermined shaped mass thereof, cutting said mass transversely thereof and freezing the severed portions.

12. A process of producing steaks which comprises arranging a plurality of pieces of meat in a material, forming a tube of said material around said meat, cutting the resultant mass transversely thereof and freezing the severed portions.

13. A method of producing steaks which comprises improving the adhesiveness of the surfaces of a plurality of pieces of meat, arranging said meat in a material, forming a tube of said material around said meat, cutting the resultant mass transversely thereof and freezing the severed portions.

14. A process of producing steaks which comprises arranging a plurality of pieces of meat on parchment paper, forming a tube of said parchment paper around said meat, cutting the resultant mass transversely thereof and freezing the severed portions.

15. A process of producing steaks which comprises arranging a plurality of pieces of meat on parchment paper, forming a tube of said parchment paper around said meat, cutting the resultant mass transversely thereof and freezing the severed portions, said parchment being wetted at some stage in the process.

16. A method of producing steaks which comprises arranging a plurality of pieces of fish meat in a material, forming a tube of said material around said fish meat, cutting the resultant mass transversely thereof, freezing the severed portions and applying pressure at some stage of the process whereby elliptical or oval shaped steaks are produced.

In testimony whereof I have affixed my signature to this specification.

HARDEN F. TAYLOR.